United States Patent [19]

Goss

[11] Patent Number: 5,786,961
[45] Date of Patent: Jul. 28, 1998

[54] SUSPENSION ASSEMBLY WITH BALL FOR STATIC ATTITUDE COMPENSATION AND LOAD POINT

[75] Inventor: Lloyd C. Goss, Bloomington, Minn.

[73] Assignee: Hutchinson Technology Incorporated, Hutchinson, Minn.

[21] Appl. No.: 721,754

[22] Filed: Sep. 30, 1996

Related U.S. Application Data

[63] Continuation of Ser. No. 236,994, May 2, 1994, abandoned.
[51] Int. Cl.⁶ .................................................. G11B 5/48
[52] U.S. Cl. ........................................................ 360/104
[58] Field of Search ............................................. 360/104

[56] References Cited

U.S. PATENT DOCUMENTS

| 4,991,045 | 2/1991 | Oberg | 360/104 |
| 5,019,931 | 5/1991 | Ohwe et al. | 360/104 |
| 5,079,660 | 1/1992 | Yumura et al. | 360/104 |
| 5,381,288 | 1/1995 | Karam | 360/104 |

FOREIGN PATENT DOCUMENTS

| 62-65275 | 3/1987 | Japan . |
| 63-90084 | 4/1988 | Japan . |
| 2-91867 | 3/1990 | Japan . |
| 3-16069 | 1/1991 | Japan . |

OTHER PUBLICATIONS

Harrison, et al., in The Double Dimple Magnetic Recording Head Suspension and its Effect on Fly Height Variability. *Transactions of the American of theSociety of Mechanical Engineers; Journal of Tribology*, 94–Trib–39, 1994.

Primary Examiner—A. J. Heinz
Attorney, Agent, or Firm—Faegre & Benson LLP

[57] ABSTRACT

A disk drive head suspension assembly for supporting a head slider over selected tracks of a rotatable data storage disk. The suspension assembly includes a load beam having proximal and distal ends and a bearing cover portion. A gimbal on the distal end of the load beam includes a flexure pad having a slider-engaging first surface and a second surface opposite the first surface. A ball-receiving hole extends through the flexure pad. A ball is mounted in the ball-receiving hole. The ball has a load point portion which extends from the second surface of the flexure pad and engages the bearing cover portion of the load beam. A static attitude compensating portion of the ball extends from the first surface of the flexure pad. A head slider is bonded to the slider-engaging first surface of the flexure pad by a layer of adhesive. The static-attitude compensating portion of the ball is engaged with the head slider and the adhesive fills spaces between the slider and the first surface of the flexure platform to hold the slider at a desired static attitude.

21 Claims, 8 Drawing Sheets

SUSPENSION ASSEMBLY WITH BALL FOR STATIC ATTITUDE COMPENSATION AND LOAD POINT

This application is a File Wrapper Continuing application of Ser. No. 08/236,994, filed May 2, 1994 and now abandoned.

BACKGROUND OF THE INVENTION

Standard head suspension assemblies (HSAs) include, as component elements, a base plate, a load beam, a gimbal flexure and a head assembly. The base plate is attached to a proximal end of the load beam, and may be configured for mounting the load beam to an actuator arm of a disk drive. The gimbal flexure is positioned on a distal end of the load beam. Mounted to the gimbal flexure is a head assembly, which is thereby supported in read/write orientation with respect to an associated disk.

A conventional gimbal flexure, sometimes referred to as a Watrous gimballing flexure design, is formed from a single sheet of material and includes a pair of outer flexible arms about a central aperture and a cross piece extending across and connecting the arms at a distal end of the flexure. A flexure tongue is joined to the cross piece and extends from the cross piece into the aperture. A free end of the tongue is centrally located between the flexible arms. The head assembly is mounted to the free end of the flexure tongue.

The head assembly, comprising a read/write transducer attached to a slider, must be mounted to the flexure tongue so that the slider is in a predetermined (e.g., planar and parallel) relationship to the disk surface. During the process of manufacturing and assembling the HSA, any lack of precision in forming or assembling the individual elements contributes to a lack of planarity in the surfaces of the elements. A buildup of such deviations from tolerance limits in the individual elements can cause deviation from desired planar parallelism in the final head suspension assembly. The parameters of static roll and static pitch torque in the final head suspension assembly result from these inherent manufacturing and assembly tolerance buildups.

Ideally, for optimum operation of the disk drive as a whole, during assembly of the slider to the flexure tongue, the mounting surface datum (to which the load beam is mounted during HSA assembly) and the slider air bearing surface datum must be parallel to each other in both planar directions. The mounting surface datum and the slider air bearing surface datum are level surfaces used as reference points or surfaces in establishing the planar parallelism of the actuator mounting surface and the slider air bearing surface relative to each other. The upper and lower surfaces of the slider are also manufactured according to specifications requiring them to be essentially or nominally parallel to each other.

Static roll torque and static pitch torque have their rotational axes about the center of the head slider in perpendicular planar directions, and are caused by unequal forces acting to maintain the desired planar parallelism on the slider while it is flying over the disk. That is, static torque is defined as a torque or a moment of force tending to cause rotation to a desired static (i.e., reference) attitude about a specific axis.

As applied to a head suspension assembly where the longitudinal axis of the slider is coincident with the longitudinal axis of the load beam, the axis of roll torque is coincident with the longitudinal axis of the head suspension assembly. The value of static roll torque is measured on either side of the static roll torque axis when the flexure tongue is parallel with the base plate. If the flexure has been twisted about the static roll torque axis during manufacture (i.e., there is planar non-parallelism of the flexure tongue with respect to the disk along this axis), the values measured on either side of the roll torque axis will not be the same. Thus, when the attached slider is in flying attitude to the associated disk surface, force (referred to as an induced roll torque value) is needed to twist the tongue back into planar parallel alignment to the disk.

The axis of pitch torque is perpendicular to the longitudinal axis of the head suspension assembly. The value of static pitch torque is measured on either side of the static pitch torque axis when the flexure tongue is parallel with the base plate. If the flexure has been twisted about the static pitch torque axis during manufacture (i.e., there is planar non-parallelism of the flexure tongue with respect to the disk along this axis), the values measured on either side of the pitch torque axis will not be the same. Thus, when the attached slider is in flying attitude to the associated disk surface, force (referred to as an induced pitch torque value) is needed to twist the tongue back into parallel alignment to the disk. It will of course be understood that in actual conditions the flexure can be twisted with respect to both axes, requiring alignment about both the pitch axis and the roll axis.

These torques can also be referred to in terms of static attitude at the flexure/slider interface and in terms of the pitch and roll stiffness of the flexure. The ideal or desired pitch and roll torques are best defined as those which would exist if the components were installed in an ideal planar parallel configuration in a disk drive. In an actual disk drive, pitch and roll static torques produce adverse forces between the air bearing surface of the slider and the disk, affecting the flying height of the slider above the disk, resulting in deviations from optimum read/write transducer and head assembly/disk interface separation.

In a conventional flexure design, the flexure tongue is offset from the flexure toward the slider to allow gimballing clearance between the upper surface of the slider and the lower surface of the flexure. This offset is formed where the flexure tongue and cross piece join, in conjunction with the dimple that is formed on the flexure tongue. This standard flexure design evidences a low value of pitch stiffness and a moderate value of roll stiffness. Pitch stiffness and roll stiffness are each measured in force X distance/degree.

Accurate formation of surface features, such as dimples or depressions, presents some difficulties. Only precise location of a dimple load point allows precise location of the slider flying surface; as the dimple load point shifts from nominal the slider has a tendency to not fly parallel to the disk.

Thus, in developing a new design for a flexure, it would be most desirable to provide a flexure and a precise method of fabrication which accurately compensate and correct for manufacturing variations that currently contribute to static pitch and roll torque errors. The manufacturing process should be efficient to perform corrections for static roll torque, as well as for static pitch torque, since the ability to correct for both static torques is needed for proper flexure/slider alignment.

SUMMARY

The present invention discloses an easy to manufacture and relatively inexpensive improved gimbal flexure, and corresponding head suspension assembly, that include a fitted hard spherical ball to allow easy adjustment during manufacture about both the pitch and the roll axis. The spherical ball offers a precisely located slider contact point and doubles up as a dimple load beam interface.

The head suspension assembly (HSA) comprises a suspension assembly and a head assembly. The suspension assembly is comprised of a gimbal assembly and a longitudinal spring element that has at least a portion stiffened into a load beam.

The gimbal assembly includes a centrally located flat flexure pad with a centrally located circular hole. The flexure pad is designed to support the head assembly. The spherical ball is fitted into the hole so that a upper gimballing portion of said spherical ball protrudes from one side of the flexure pad and a lower pivot portion of the ball protrudes from the other side. The ball is non-magnetic and has a static friction coefficient lower than that of stainless steel.

The gimbal assembly also includes a bearing cover. The cover is joined to or integral with the load beam and is placed over the gimballing portion of the ball. The cover extends over the ball and presses against it at a bearing point that defines the intersection of gimbal pitch and roll axes.

The head assembly's slider attaches to the bottom surface of the flexure pad against the lower pivot portion of the ball. The pivot portion of the ball provides a pivot interface for eliminating adverse pitch and roll torques resulting from pitch and roll static errors during manufacture and assembly.

The spherical ball can be interference fitted or adhesively fitted into the circular hole. In a preferred embodiment the flexure pad is shaped as a rectangular tongue projecting along the longitudinal axis from a distal end of the load beam. The spherical ball may be a polished glass bead, a tungsten carbide bearing, or other similar hard, non-magnetic, and corrosion resistant materials.

BRIEF DESCRIPTION OF THE DRAWINGS

The features, aspects, and advantages of the present invention will become better understood with regard to the following description, appended claims, and accompanying drawings, where:

DETAILED DESCRIPTION OF THE INVENTION

Figure 1:
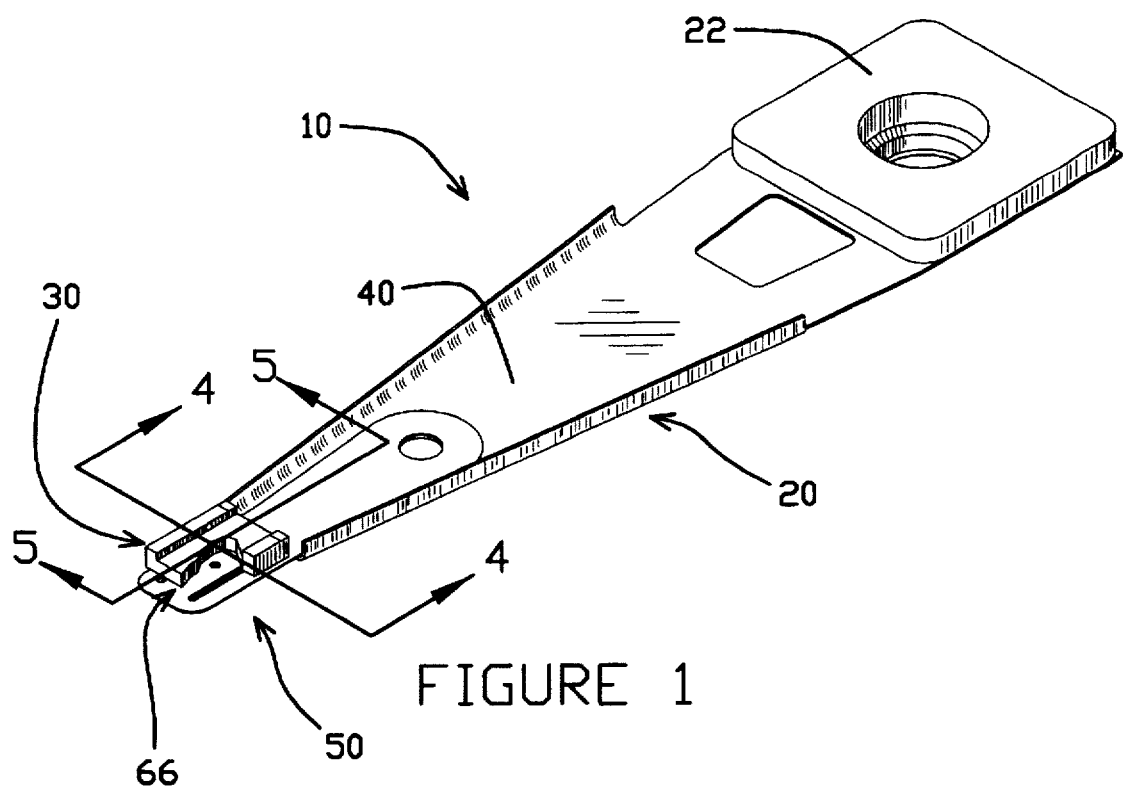
FIG. 1 is a perspective bottom view of a head suspension assembly including the gimbal ball interface.

FIG. 1 shows the disk-facing side of an assembled head suspension assembly (HSA) 10. FIG. 3 shows the other side of the same HSA 10. The HSA 10 comprises a suspension assembly 20 and a head assembly 30. The length of the HSA 10 defines a longitudinal axis that bisects the HSA 10 down the middle. The suspension assembly 20 usually includes a load beam 40 and a gimbal assembly 50. The proximal end of the suspension assembly 20 is reinforced by a base plate 22 that may be configured for mounting to an actuator arm (not shown) used in some disk drives. The head assembly 30 includes a transducer mounted to an air-bearing slider 32, shown in FIGS. 2, 4, 5, and 7.

Figure 2:
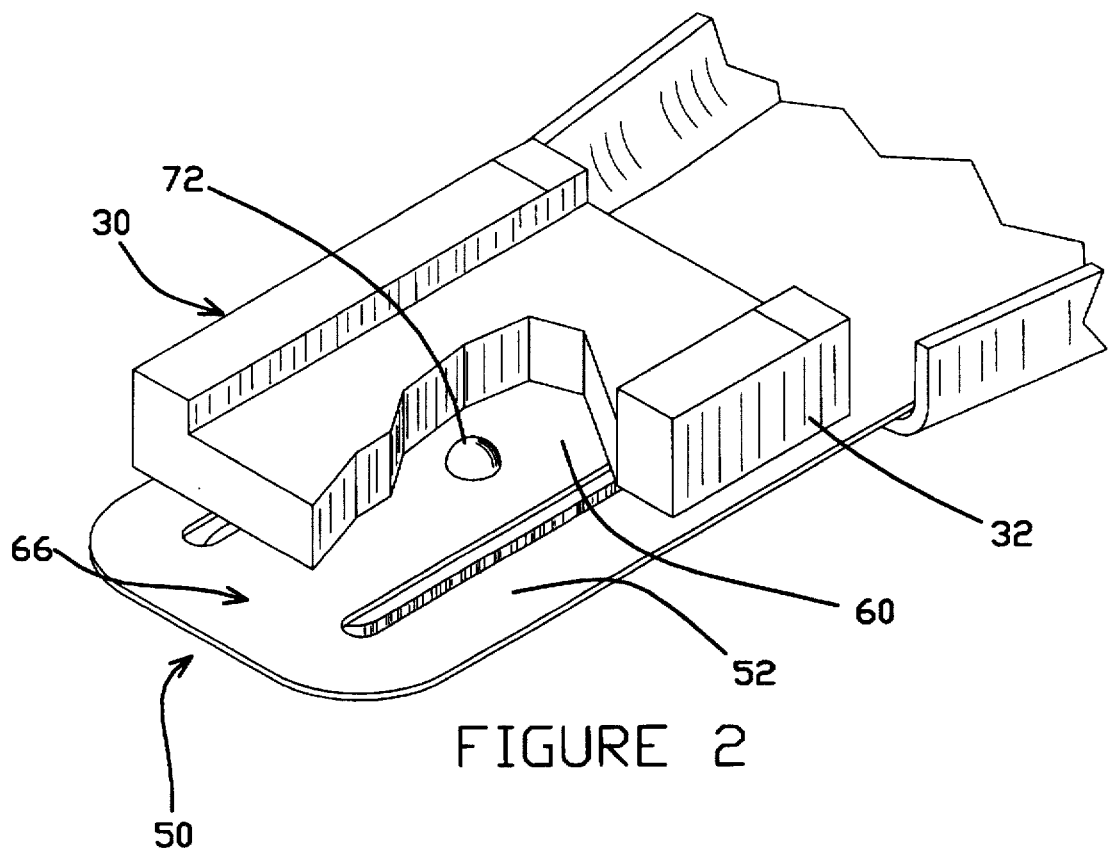
FIG. 2 is an enlarged perspective cut-away bottom view of the gimbal ball interface of FIG. 1.
Figure 3:
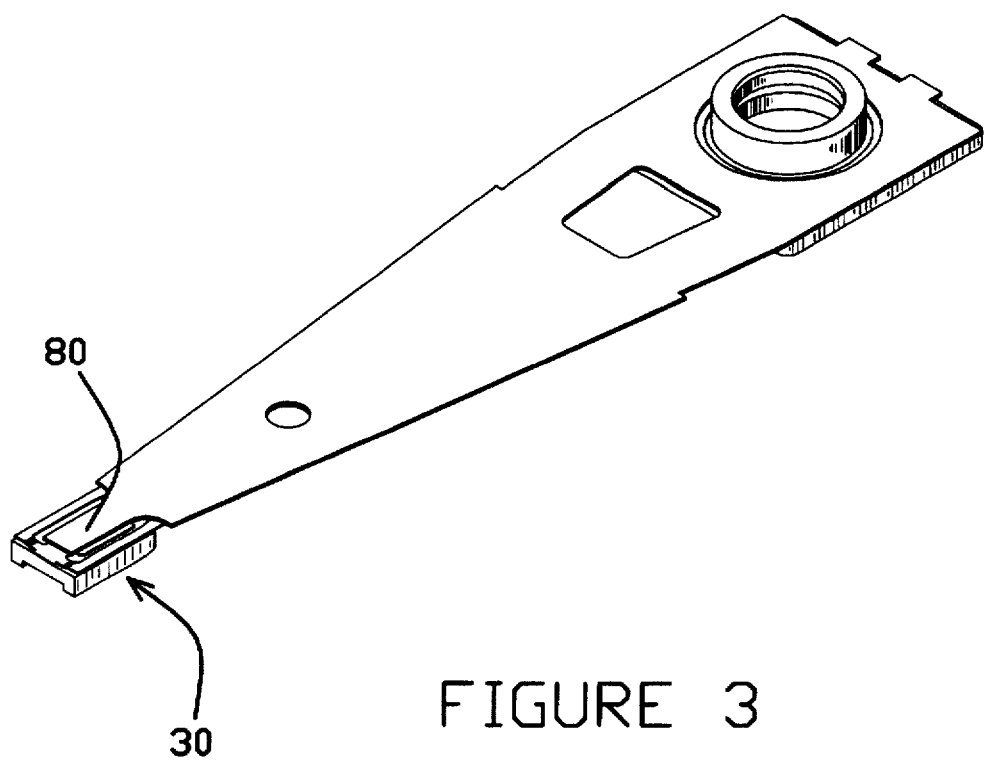
FIG. 3 is a perspective top view of the assembled head suspension assembly of FIG. 1.

FIG. 2 shows a cut-away view of the distal end of the gimbal assembly 50 coupling to the head assembly 30. The gimbal assembly 50 of FIG. 1 and 2 attaches to the distal end of the load beam 40. It includes torsion arms 52 supporting a flexure pad 60 over a central aperture. The flexure pad 60 is shaped and arranged to support the head assembly 30. Among the many possible gimbal designs, the flexure pad 60 may be shaped as a flat rectangular flexure tongue, as in the embodiment of FIGS. 1–3 or in the embodiment shown in FIGS. 8 and 9. It can also be shaped as a suspended platform, such as in the different embodiments shown in FIGS. 10 and 11. The flexure pad 60 and the torsion arms 52 may be a separate attached element, such as that of FIGS. 1–2, or an integral projection from the load beam 40, such as in the embodiment of FIGS. 8–11.

In the illustrated embodiments, the flexure pad 60 is centrally located along the longitudinal axis, at the center of the central aperture. The flexure pad 60 includes a circular hole 62, seen in the exploded views of FIGS. 8 and 10, located also on the longitudinal axis. The hole 62 is centrally placed with respect to the width of the gimbal assembly 50. The flexure pad 60 also includes a first surface 64, seen in FIGS. 8 and 9, and a second surface 66, seen in FIGS. 1 and 2. In a preferred method of manufacture, hole 62 is etched. In fact, most elements of the suspension assembly 20 are etched stainless steel.

Figure 4:
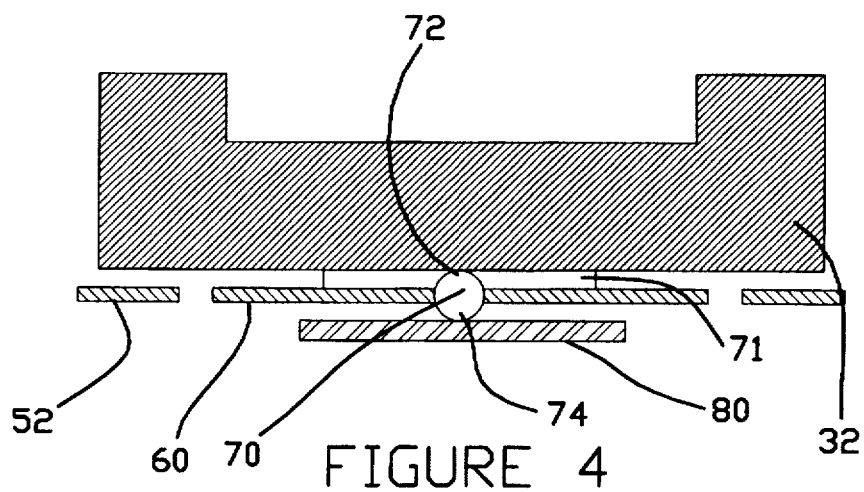
FIG. 4 is a view of a cross-sectional cut along line 4—4 in FIG. 1.
Figure 5:
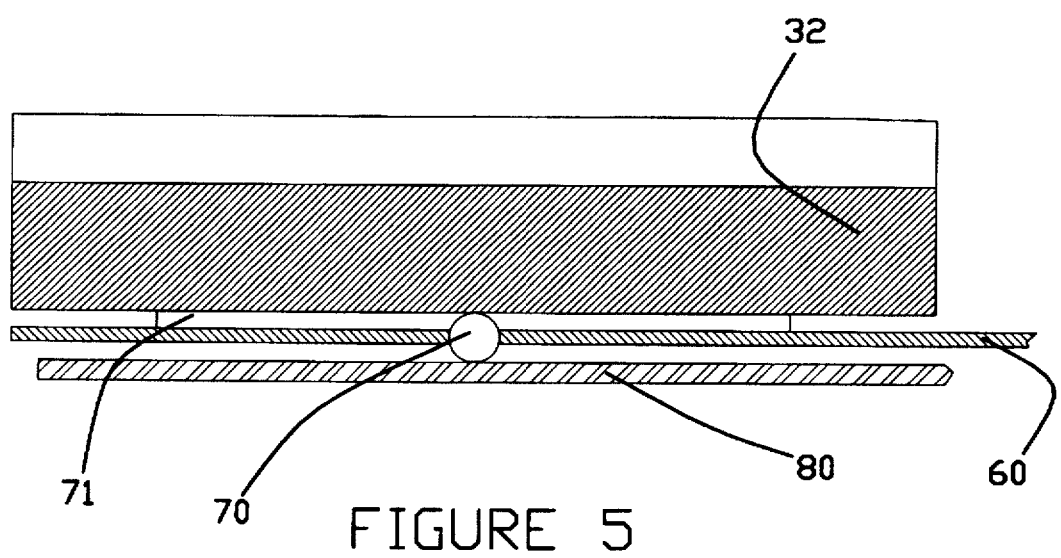
FIG. 5 is a view of a cross-sectional cut along line 5—5 in FIG. 1.
Figure 7:
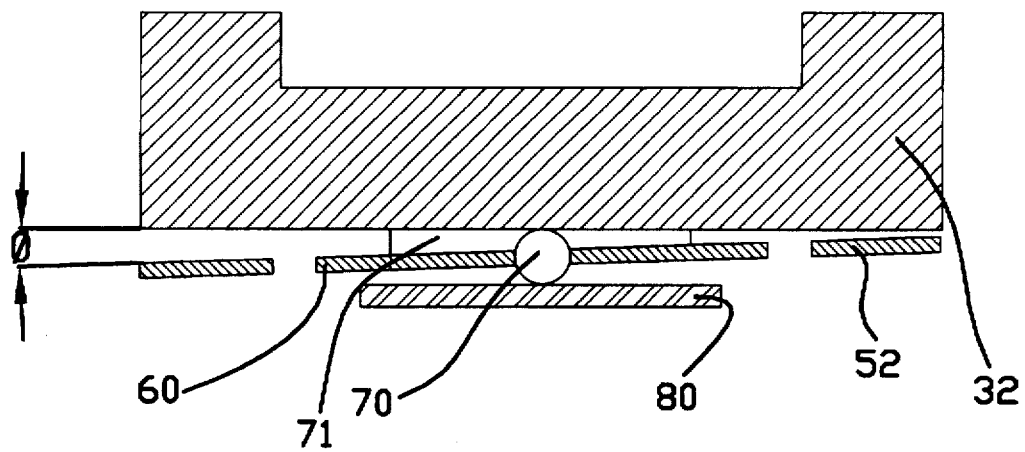
FIG. 7 is a view of a cross-sectional cut along line 4—4 in FIG. 1, wherein the gimbal ball interface compensates for planar parallelism deviations.

As shown in FIGS. 4 and 5, a spherical ball 70 fits into the circular hole 62. In the designs of FIG. 1 and 2 a ≈100 um diameter glass bead is interference fit into an etched hole in the ≈25 um tongue of a gimbal flexure. Glass beads offer advantages in cost and performance. Other size balls could be used depending on the size and structure of the HSA 10. The lower pivot portion 72 of the ball which protrudes ≈38 um from the second surface 66 provides a spherical pivot interface to the top of the slider 32 for eliminating adverse pitch and roll torques which normally result from pitch and roll static attitude errors, as shown in FIG. 7. The upper gimballing portion 74 of the ball, shown in FIG. 4, protrudes from the first surface 64 and provides a dimple load beam interface for gimballing and to act as a load point.

Figure 6:
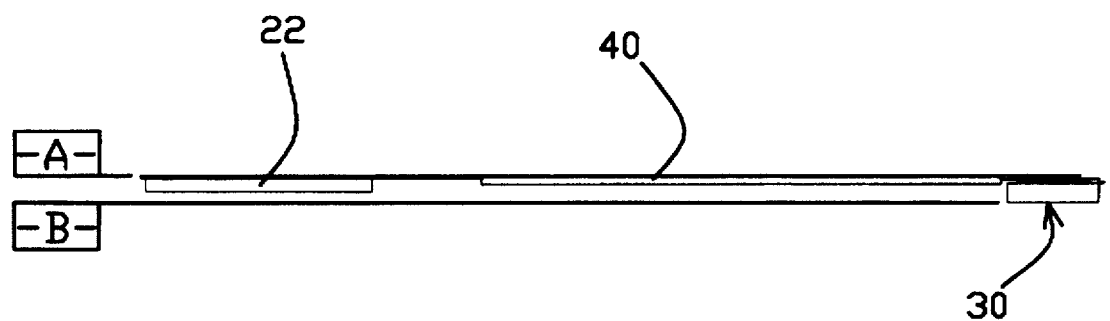
FIG. 6 is a side view of the load beam positioned along surface datum plane -A- and of the slider positioned along surface datum plane -B-.

During assembly of the HSA 10, the Reference Datum Planes -A- and -B-, shown in FIG. 6, are spaced at a height Z and are positioned to achieve the desired planar parallelism. The suspension assembly 20 is aligned on datum plane -A- and the slider's air bearing surface rests on datum plane -B-. As shown in FIG. 7, the spherical ball 70 serves as a pivot surface to allow for adjustments along the pitch and roll axis necessary to achieve the desired planar parallelism. FIG. 7 shows, for example, adjustments to compensate for a misaligned or twisted flexure pad 60. The gimbal interface allows for similar adjustments to correct for a twisted bearing cover, or a twisted bearing cover and twisted flexure pad. The deviations could be in the same or in opposite directions and along both the roll and the pitch axes. Adhesive 71 fills the space between the top of the slider 32 and the flexure pad 60 that results in a non-uniform bond line that allows for the non-planarity of the components to prevent static pitch and roll torque errors. The spherical ball 70 provides a means of slider bonding which greatly reduces or entirely eliminates static pitch and roll torques due to static pitch and roll attitude errors and tolerances.

The glass bead further improves HSA performance by reducing stick/slip since glass to steel static friction is lower than steel to steel friction in a conventional formed dimple design. The glass bead located in the etched circular hole 62 also gives precise location of the dimple load point relative to the gimbal flexure as the hole 62 can be manufactured, e.g. etched, simultaneously with the gimbal flexure. This allows precise location of the slider's flying surface relative to the load point to achieve the desired flying height profile of the slider 32 relative to the disk.

Figure 8:
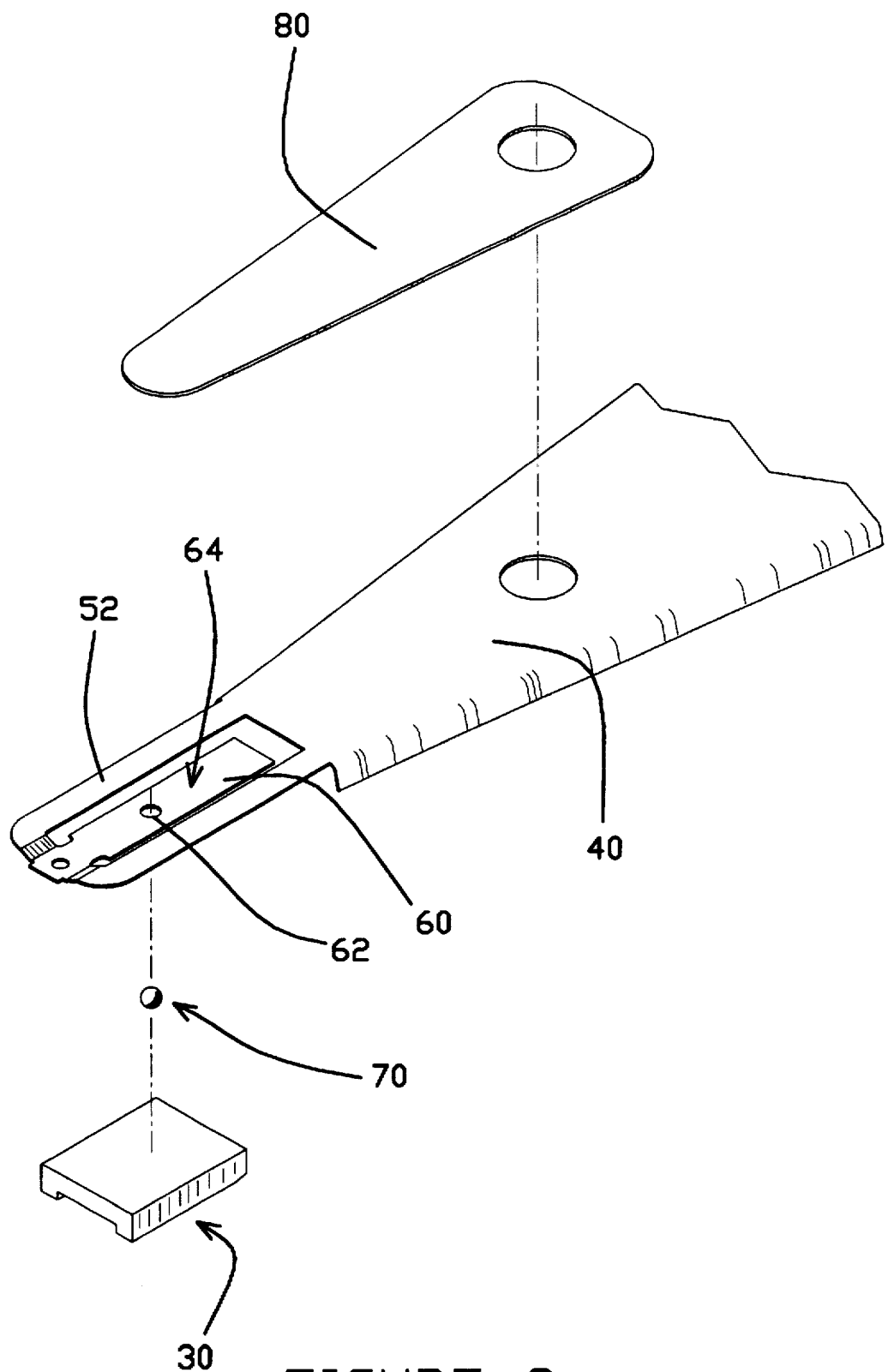
FIG. 8 is an exploded perspective top view of a head suspension assembly according to the present invention.
Figure 9:
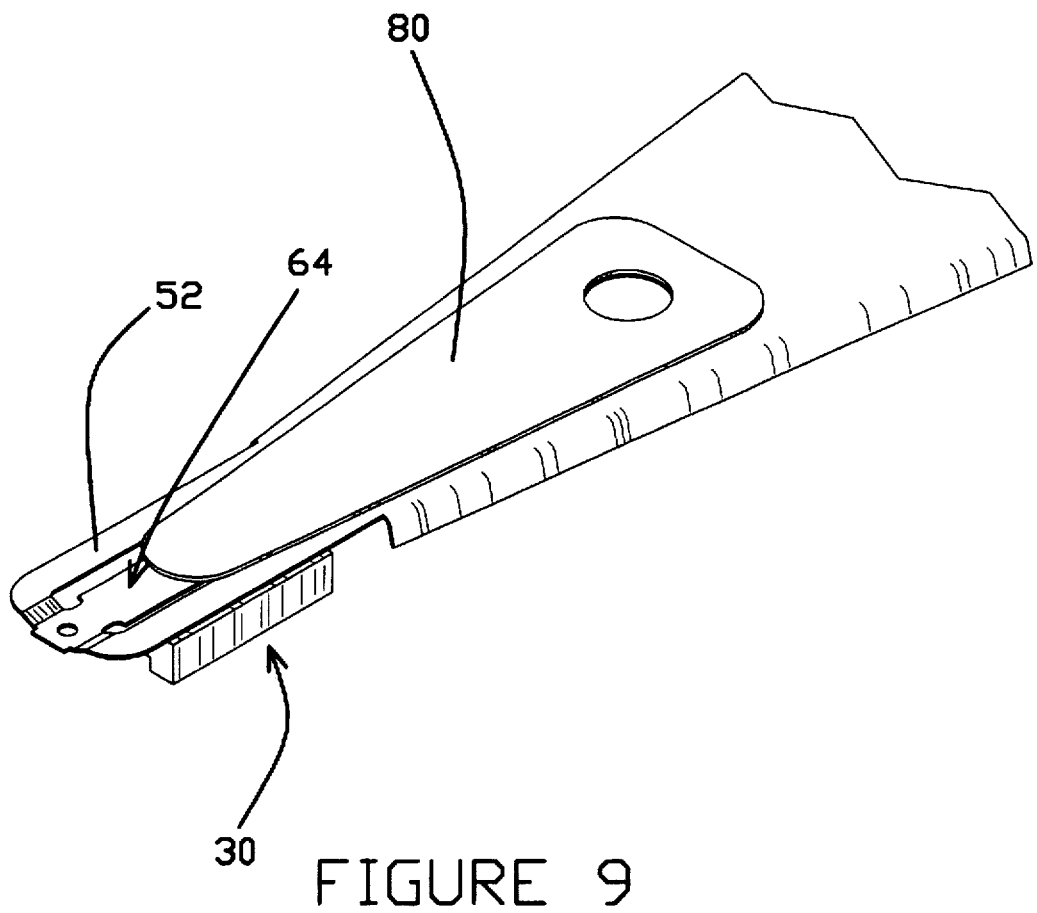
FIG. 9 is a top view of the assembled head suspension assembly of FIG. 8.

The ball 70 can be manufactured in other embodiments. FIGS. 8 and 9 show a HSA using a Tungsten Carbide ball of approximately 250 um diameter. The surface finish of such a ball can easily be <1.5 um RMS due to the hard surface of the Tungsten Carbide. Balls of other hard, non-magnetic, and corrosion resistant materials are also acceptable. Some possibilities are ceramics of structural variety.

The gimbal assembly 50 also includes a bearing cover 80, illustrated in FIGS. 3, 8–11, joined to the load beam 40. The cover 80 can be an integral projection of the load beam 40, such as the rectangular "T" projection of FIG. 3, or it can be a separate element, as in FIGS. 8–11, attached (by adhesive, welds, or other methods known in the art) to the load beam 40. The cover 80 extends over a portion of the flexure pad 60 and over the spherical ball 70.

Figure 10:
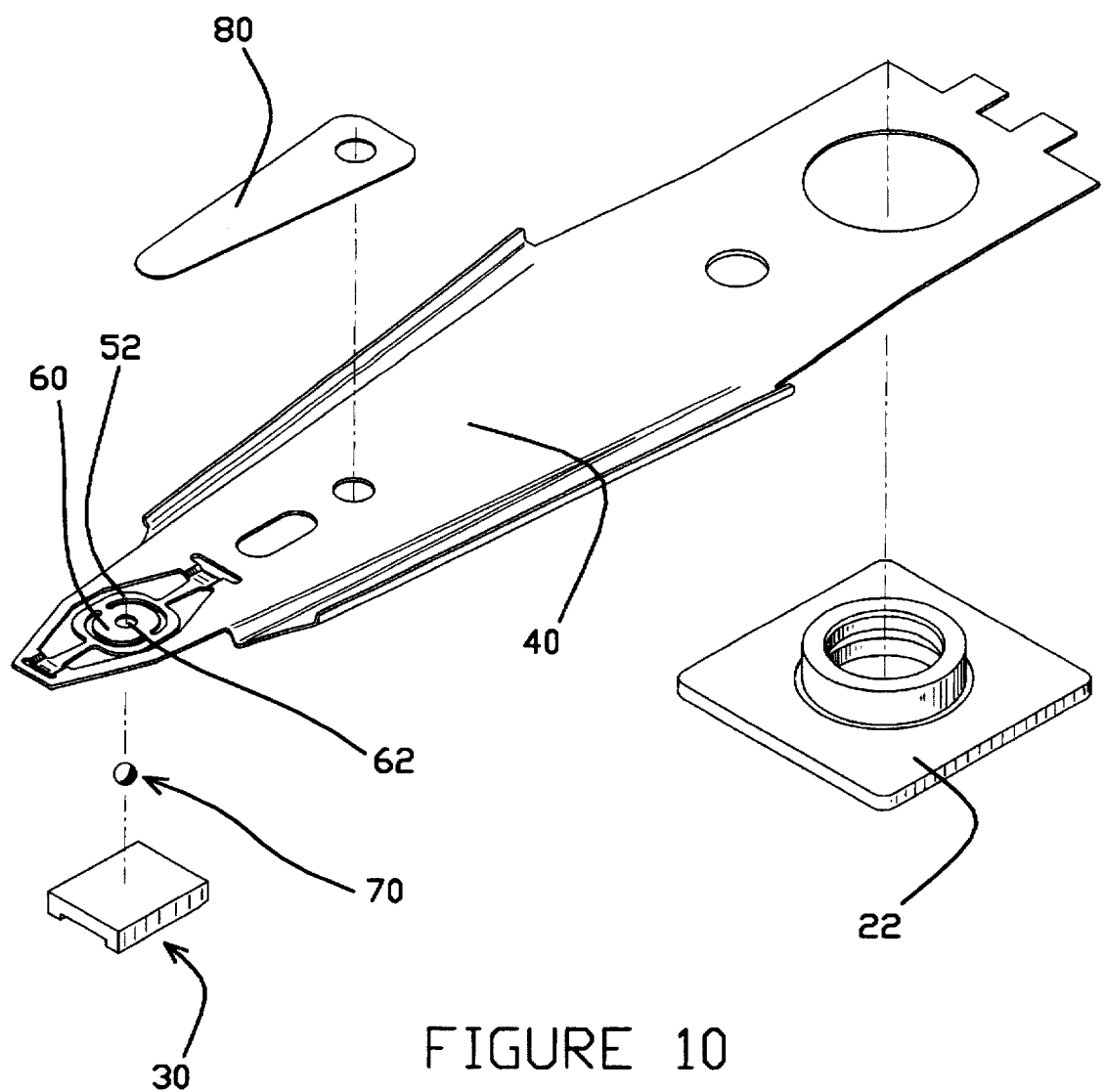
FIG. 10 is an exploded perspective top view of a head suspension assembly according to the present invention.
Figure 11:
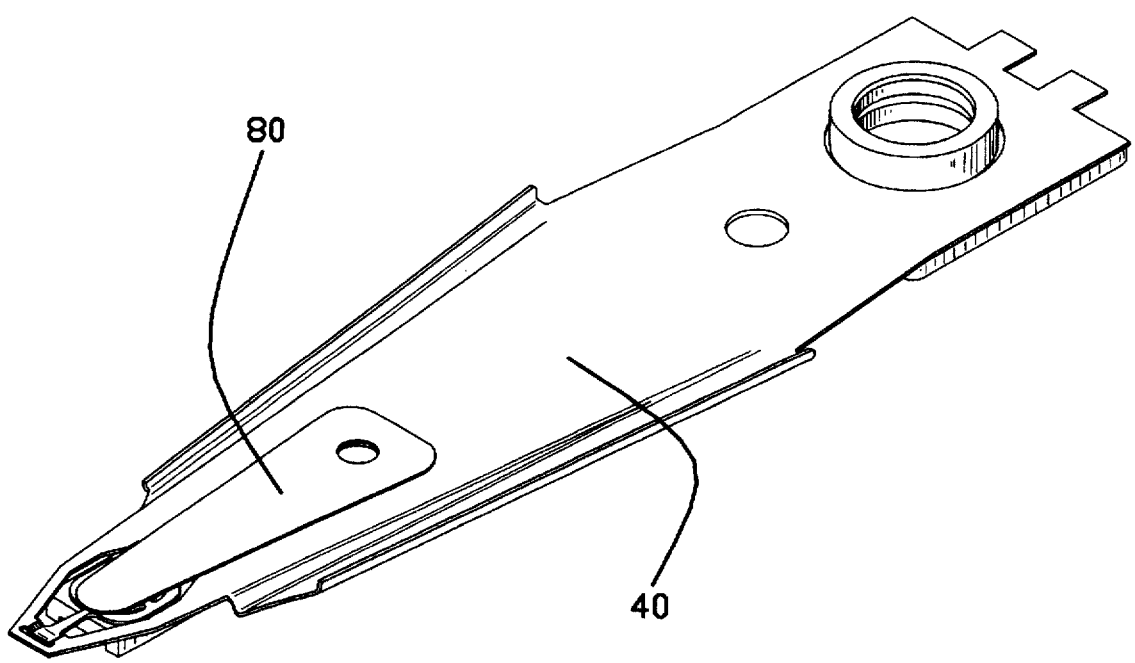
FIG. 11 is a top view of the assembled head suspension assembly of FIG. 10.

The cover 80 contacts the ball 70 and presses against it, thus defining the intersection of the gimbal pitch and roll axes. In this way the spherical ball 70 also acts as a load beam interface. The cross-sections of FIGS. 4, 5 and 7 illustrate how the slider 32, the spherical ball 70, the flexure pad 60, and the bearing cover 80 interact together to allow pivotal adjustments along both the pitch and roll axes. FIGS. 8 and 10 show exploded perspective views of how all the elements come together.

The advantages of the gimbal ball interface over the prior art are numerous. Unlike other gimbals that use spherical surfaces, the present invention allows the ball 70 to perform not one, but two functions, both as a pivot interference point that allows adjustments with respect to both axes, and as a load beam interface that allows normal gimballing motion. An improved smooth surface finish reduces the effects of stick/slip in comparison to stainless steel load buttons or dimples. A second advantage of this design is the precise location and alignment of the contact point between a load point formed by the spherical ball 70 and the bearing cover 80. In FIG. 3 for example, the ball 70 is fit onto the hole 62 and the contact point of the ball 70 to the bearing cover 80 is very near the geometric center of the etched hole 62. This makes precise location of the load point to the slider more accurate than a formed dimple, a concave cavity, or formed depressions for holding a ball, which cannot be located as precisely on the load arm of the suspension. Also a formed dimple develops "orange peel" roughness on the surface which mates with the bearing cover 80 further increasing the effect of stick/slip. The use of a highly polished ball as the load point reduces stick/slip and provide improved load position accuracy. Insertion of the ball into the flexure pad 60 locating hole 62 can be readily accomplished by press fitting or adhesively bonding the suspension over the spherical ball surface.

The invention is not to be taken as limited to all of the details thereof as modifications and variations thereof may be made without departing from the spirit or scope of the invention.

What is claimed is:

1. A disk drive head suspension assembly for supporting a head slider over selected tracks of a rotatable data storage disk, comprising:

a load beam having proximal and distal ends and a bearing cover portion;

a gimbal on the distal end of the load beam, including:
  a flexure pad having a slider-engaging first surface and a second surface opposite the first surface;
  a ball-receiving hole in the flexure pad;

a ball mounted in the ball-receiving hole in the flexure pad and having a load point portion extending from the second surface of the flexure pad and engaging the bearing cover portion of the load beam, and a static attitude compensating portion extending from the first surface of the flexure pad;

a head slider having a gimbal-engaging surface and a transducer; and a layer of adhesive for bonding the gimbal-engaging surface of the head slider to the slider-engaging first surface of the flexure pad, and wherein the static-attitude compensating portion of the ball is engaged with the gimbal-engaging surface and the adhesive fills spaces between the gimbal-engaging surface of the slider and the first surface of the flexure platform to hold the slider at a desired static attitude.

2. The head suspension assembly of claim 1 wherein the ball is interference mounted in the hole.

3. The head suspension assembly of claim 1 wherein the hole is circular and has a diameter which is larger than the diameter of the ball, and the ball is adhesively mounted in the circular hole.

4. The head suspension assembly of claim 1 wherein the flexure pad is shaped as a rectangular tongue projecting along a longitudinal axis of the load beam.

5. The head suspension assembly of claim 1 wherein the ball is a polished glass bead.

6. The head suspension assembly of claim 1 wherein the ball is a tungsten carbide ball.

7. The head suspension assembly of claim 1 wherein:
the bearing cover portion of the load beam is integral with the load beam; and
the gimbal is mounted to the distal end of the load beam.

8. The head suspension assembly of claim 1 wherein:
the gimbal is integral with the load beam; and
the bearing cover portion of the load beam is mounted to the distal end of the load beam.

9. A disk drive head suspension for use in connection with a head slider having a gimbal-engaging surface which is adapted to be bonded to the head suspension by adhesive, the suspension comprising:

a load beam having proximal and distal ends and a bearing cover portion;

a gimbal on the distal end of the load beam, including:
  a flexure pad having a slider-engaging first surface and a second surface opposite the first surface; and
  a ball-receiving hole in the flexure pad;

a ball mounted in the ball-receiving hole in the flexure pad and having a load point portion extending from the second surface of the flexure pad and engaging the bearing cover portion of the load beam, and a static attitude compensating portion extending from the first surface of the flexure pad; and wherein the static attitude compensating portion of the ball is adapted to engage the gimbal-engaging surface of the head slider when the head slider is bonded to the first surface of the flexure pad by adhesive, and the adhesive fills spaces between the gimbal-engaging surface of the slider and the first surface of the flexure platform to hold the slider at a desired static attitude.

10. The head suspension of claim 9 wherein the diameter of the hole is larger than the diameter of the ball, and the ball is adhesively mounted in the hole.

11. The head suspension of claim 9 wherein the ball is a polished glass bead.

12. The head suspension of claim 9 wherein the ball is a tungsten carbide ball.

13. The head suspension of claim 9 wherein the ball is interference mounted in the hole.

14. The head suspension of claim 9 wherein:

the bearing cover portion of the load beam is integral with the load beam; and the gimbal is mounted to the distal end of the load beam.

15. The head suspension of claim 9 wherein:

the gimbal is integral with the load beam; and the bearing cover portion of the load beam is mounted to the distal end of the load beam.

16. A method for manufacturing a disk drive head suspension assembly for use in connection with a head slider having a gimbal-engaging surface which is adapted to be bonded to the head suspension assembly by adhesive, including:

manufacturing a suspension including a load beam, a base on a proximal end of the load beam, a gimbal having a flexure pad with a slider-engaging first surface and a second surface opposite the first surface on a distal end of the load beam, and a bearing cover portion extending over the gimbal;

forming a ball-receiving hole in the flexure pad;

mounting a ball in the ball-receiving hole of the flexure pad, with a load point portion of the ball extending from the second surface of the flexure pad and engaging the bearing cover portion of the load beam, and a static attitude compensation portion of the ball extending from the slider-engaging first surface of the flexure pad; and wherein the static attitude compensation portion of the ball is adapted to engage the gimbal-engaging surface of the head slider when the head slider is bonded to the first surface of the flexure pad by adhesive, and the adhesive fills spaces between the gimbal-engaging surface of the slider and the first surface of the flexure pad to hold the slider at a desired static attitude.

17. The method of claim 16 wherein mounting the ball includes interference fitting the ball into the hole.

18. The method of claim 16 wherein mounting the ball includes adhesively mounting the ball in the hole.

19. The method of claim 16 and further including:

providing a mounting fixture having first and second datum planes in a predetermined orientation with respect to one another;

providing a head slider having a gimbal-engaging surface;

positioning the head slider on the first datum plane of the mounting fixture;

positioning the base of the suspension on the second datum plane of the fixture, with the static attitude compensation portion of the ball engaging the gimbal-engaging surface of the head slider; and adhesively bonding the gimbal-engaging surface of the head slider to the slider-engaging surface of the flexure pad, with the adhesive filling spaces between the gimbal-engaging surface of the slider and the slider-engaging surface of the flexure pad to hold the slider at a predetermined static attitude.

20. The method of claim 16 wherein manufacturing the suspension includes:

manufacturing the bearing cover portion of the suspension separate from the load beam; and mounting the bearing cover portion to the load beam.

21. The method of claim 16 wherein manufacturing the suspension includes:

manufacturing the gimbal of the suspension separate from the load beam; and mounting the gimbal to the load beam.

* * * * *